(12) United States Patent
Kornylo

(10) Patent No.: US 8,714,626 B2
(45) Date of Patent: May 6, 2014

(54) STITCHED SEAMS FOR VEHICLE INTERIOR COVERINGS

(75) Inventor: Walter Kornylo, Livonia, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 152 days.

(21) Appl. No.: 13/158,967

(22) Filed: Jun. 13, 2011

(65) Prior Publication Data

US 2012/0313391 A1 Dec. 13, 2012

(51) Int. Cl.
*B60R 13/02* (2006.01)

(52) U.S. Cl.
USPC ..... 296/146.7; 296/70; 296/1.08; 112/475.18

(58) Field of Classification Search
USPC ............ 296/39.1, 70, 146.7, 1.07–1.09; 112/475.01, 475.06, 475.17, 475.18, 112/426, 427, 439; 29/91, 91.1
See application file for complete search history.

(56) References Cited

U.S. PATENT DOCUMENTS

| | | | |
|---|---|---|---|
| 1,994,966 A | | 3/1935 | Seaman |
| 5,395,473 A | * | 3/1995 | Nixon ........................... 156/291 |
| 6,214,157 B1 | * | 4/2001 | Spengler ..................... 156/304.6 |
| 6,328,367 B1 | * | 12/2001 | Eichhorn et al. ................. 296/70 |
| 6,450,678 B1 | * | 9/2002 | Bayersdorfer ................ 362/581 |
| 6,997,126 B2 | | 2/2006 | Murley |
| 7,014,907 B2 | * | 3/2006 | Kobayashi et al. ........... 428/192 |
| 7,052,566 B2 | * | 5/2006 | Wright et al. ................... 156/93 |
| 7,278,363 B2 | | 10/2007 | Wieczorek et al. |
| 7,421,962 B2 | | 9/2008 | Wieczorek et al. |
| 7,588,814 B2 | * | 9/2009 | Olley et al. .................... 428/102 |
| 7,661,740 B2 | * | 2/2010 | Saito ............................. 296/1.08 |
| 7,690,318 B2 | * | 4/2010 | Dooley et al. ............. 112/475.17 |
| 7,851,039 B2 | * | 12/2010 | Boinais et al. ................. 428/103 |
| 7,922,956 B1 | | 4/2011 | Scheidmantel et al. |
| 8,293,055 B2 | * | 10/2012 | Aoyama et al. ............... 156/245 |
| 2003/0168151 A1 | * | 9/2003 | Wright et al. ................... 156/93 |
| 2005/0081771 A1 | * | 4/2005 | Kromm et al. ............ 112/475.08 |
| 2006/0186129 A1 | | 8/2006 | Allnutt et al. |
| 2007/0014969 A1 | * | 1/2007 | Olley et al. .................... 428/104 |
| 2007/0022931 A1 | | 2/2007 | Wieczorek et al. |
| 2008/0006194 A1 | * | 1/2008 | Morita et al. ............. 112/475.04 |

(Continued)

FOREIGN PATENT DOCUMENTS

| | | |
|---|---|---|
| JP | 3068399 | 3/1991 |
| JP | 2009196610 | 9/2009 |
| WO | WO01/12890 | 2/2001 |

OTHER PUBLICATIONS

International Search Report for PCT/US2012/042204 dated Nov. 30, 2012, 3 pages.

*Primary Examiner* — Glenn Dayoan
*Assistant Examiner* — Gregory Blankenship
(74) *Attorney, Agent, or Firm* — Reising Ethington P.C.

(57) ABSTRACT

A vehicle interior component including a decorative covering includes a seam formed therein. The seam is formed in a single sheet of covering material while having the appearance of being formed by sewing two separate pieces of covering material together. The seam includes lines of functional stitching and decorative stitching and can simulate the appearance of a French seam. Sewing the decorative stitching into the single sheet of covering material can allow symmetric thread patterns to be more readily formed as part of the finished seam, and a seam can be located anywhere along the surface of a sheet of covering material to achieve a cut-and-sew appearance.

10 Claims, 2 Drawing Sheets

(56) References Cited

U.S. PATENT DOCUMENTS

2008/0073813 A1* 3/2008 Smith et al. .................. 264/266
2008/0093830 A1* 4/2008 Takezawa et al. ............ 280/751
2009/0167000 A1* 7/2009 Peyre et al. .................. 280/728.1
2010/0171333 A1* 7/2010 Smith et al. .................. 296/1.08
2011/0000061 A1* 1/2011 Dooley et al. ................ 29/91.1
2012/0313391 A1* 12/2012 Kornylo ....................... 296/1.08

* cited by examiner

STITCHED SEAMS FOR VEHICLE INTERIOR COVERINGS

TECHNICAL FIELD

The present disclosure relates generally to stitched seams in vehicle interior covering materials.

BACKGROUND

Vehicle interiors utilize various types of decorative components to provide a desired aesthetic. Certain types of materials and components, such as leather or genuine wood trim, may traditionally provide a vehicle interior with a luxurious feel because the cost of such materials may be relatively high, making them affordable only to purchasers of expensive vehicles. One distinctive feature of leather trim materials is what may be termed a "cut-and-sew" look, where pieces of leather material are hand-sewn together, often with decorative stitching, to form a covering to fit the contours of various types of interior components. Some efforts have been made to simulate such a hand-sewn look to make it more affordable for use in less expensive vehicles.

U.S. Pat. No. 7,922,956 to Scheidmantel et al. describes one technique that purports to simulate a cut-and-sew look. The method taught by Scheidmantel includes molding a component from a plastic material using a mold that has the shape of a simulated sewn joint formed in the mold surface. When removed from the mold, the molded component includes a molded-in simulated sewn joint in the form of a pair of ridges with an indentation between the ridges. Scheidmantel then teaches adding a thread-stitched seam parallel to the ridges to simulate a sewn joint.

SUMMARY

According to one embodiment, a method of making a vehicle interior component having a decorative covering includes the steps of: (a) providing a single sheet of covering material having an outer surface; (b) folding the single sheet of covering material along a fold line such that first and second portions of the outer surface are in facial contact; (c) sewing a line of functional stitching through the folded sheet of covering material such that the stitching passes through both the first and second portions of the outer surface at a location proximate the fold line; and (d) disposing the sewn covering material over a vehicle interior component substrate.

According to another embodiment, a vehicle interior component includes a decorative covering disposed over a vehicle interior component substrate. The decorative covering includes first and second portions of covering material having an outer surface. The decorative covering also includes a seam having a line of functional stitching and a line of decorative stitching. The line of functional stitching joins the first and second portions of covering material together. The line of decorative stitching is spaced a selected distance from the line of functional stitching along the outer surface of the covering material and is formed through a single layer of covering material in a direction substantially parallel to the line of functional stitching.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The following description is directed at various embodiments that include methods of forming seams in covering materials. In particular, certain highly sought after seams may be produced using the techniques disclosed herein. For instance, with some types of decorative and/or functional seams, thread pattern symmetry may be desired across the joint where two pieces of material are sewn together. While hand-sewing may be able to produce such symmetry, it may be cost and time prohibitive. Additionally, some types of seams traditionally require sewing through multiple layers of material, which can be difficult with certain materials and machines and can also cause excessive process variation. By sewing a hybrid seam that is partially functional and partially decorative into a single piece of material, some of these problems may be mitigated.

Figure 1:
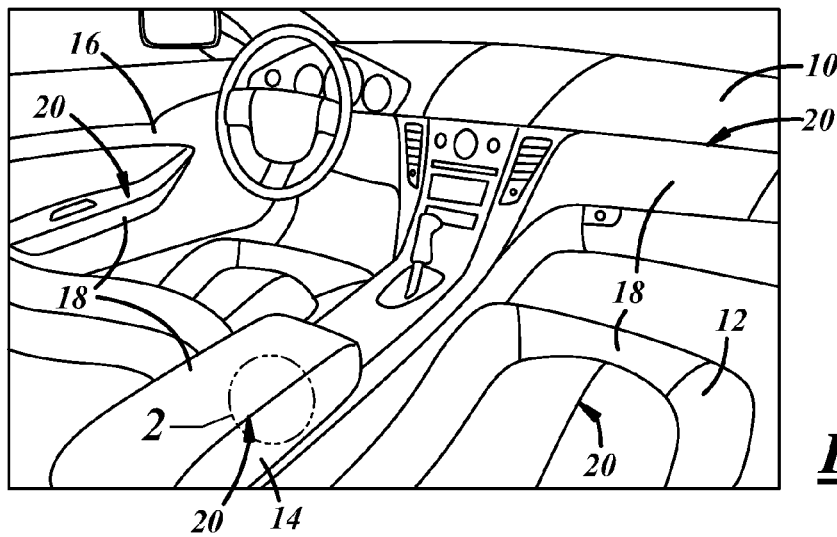
FIG. 1 is a perspective view of a vehicle interior, showing various vehicle interior components that may include decorative coverings.

Referring now to FIG. 1, a vehicle interior is shown to illustrate various examples of vehicle interior components that may include coverings with stitched seams. Instrument panel assembly 10, seat assembly 12, console assembly 14, and door panel assembly 16 may all include decorative coverings 18 disposed over and/or attached to their respective component substrates using known techniques. Illustrative locations for seams 20 are shown for each of these components. The coverings and seams disclosed below may be used with any other interior component as well, such as steering wheel assemblies, shifter assemblies, etc. Each of coverings 18 may be constructed as a single layer of material or as two or more layers of material, such as an outer decorative layer laminated or otherwise attached to an inner foam or textile layer. In the examples shown in the figures, each covering 18 is shown as a single layer for simplicity. Choices for covering materials are nearly limitless and include leather, simulated leather, polymer-based materials, or other woven or non-woven textiles.

Figure 2:
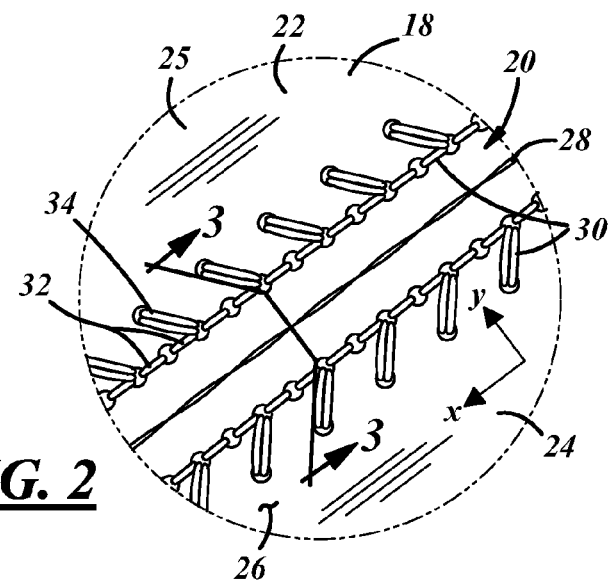
FIG. 2 is an enlarged view of one vehicle interior component of FIG. 1, including a decorative covering having a seam according to one embodiment.

FIG. 2 is an enlarged view of a portion of a decorative covering 18. Decorative covering 18 includes seam 20 that joins and/or decorates first and second portions 22 and 24 of covering material 25. Covering material 25 also includes an outer surface 26, at least a portion of which faces away from the underlying substrate when disposed over a component substrate. Outer surface 26 may have a grain pattern formed therein or other decorative features. Seam 20 may include a line of functional stitching 28 and one or more lines of decorative stitching 30, with two lines of decorative stitching shown in the illustrative seam of FIG. 2. Some embodiments may include one or more lines of functional stitching and no lines of decorative stitching, as the techniques taught herein may be useful even without decorative stitching. As used herein, a "line" of stitching refers to stitching that follows a generally continuous path along the covering material and is not limited to stitches arranged in a straight line. For example, a line of stitching may follow a curvilinear path and separate curved lines of stitching may be considered parallel where the two lines follow paths that are separated by a constant distance. Further details of some of the individual elements of covering 18 and seam 20 are discussed in further detail in conjunction with FIG. 3 following a detailed description of the exemplary seam 20 depicted in FIG. 2.

The particular seam 20 depicted in FIG. 2 includes some features worth noting. The line of functional stitching 28 and each of the lines of decorative stitching 30 are formed in covering material 25 in parallel directions (in the x-direction of FIG. 2). In this example, the lines of stitching 28 and 30 are all generally parallel, but it is possible that the general directions of the lines are parallel while the lines themselves are not, such as with a line of decorative stitching along a zigzag or wavy path. Each line of decorative stitching 30 is also spaced apart from and substantially equidistant from the center of the seam or from the line of functional stitching 28. The two lines of decorative stitching 30 in this embodiment are also symmetric with respect to the line of functional stitching 28. More specifically, each line of decorative stitching shown in FIG. 2 includes a plurality of individual stitches arranged in respective thread patterns that are symmetric with respect to the functional stitching. Each line of decorative stitching 30 in this embodiment includes a plurality of individual lengthwise stitches 32 and angled stitches 34. Each stitch 32 is arranged end-to-end and extends along outer surface 26 in the x-direction, while each stitch 34 extends at an angle and away from lengthwise stitches 32 in the y-direction. This particular thread pattern may be referred to as a herringbone pattern. Thread patterns like this one that include angled stitches are not symmetric with respect to any axis that is perpendicular to the line of functional stitching (or to the y-axis of FIG. 2). Also, thread patterns such as herringbone or other patterns that include stitches that extend in a direction away from the line of functional stitching may cause any lack of symmetry across the seam to be more noticeable because the stitches are not arranged end-to-end. For example, a lack of symmetry in the plurality of exemplary stitches 32 on each side of the seam may not be as immediately noticeable as a lack of symmetry in exemplary stitches 34.

Figure 3:
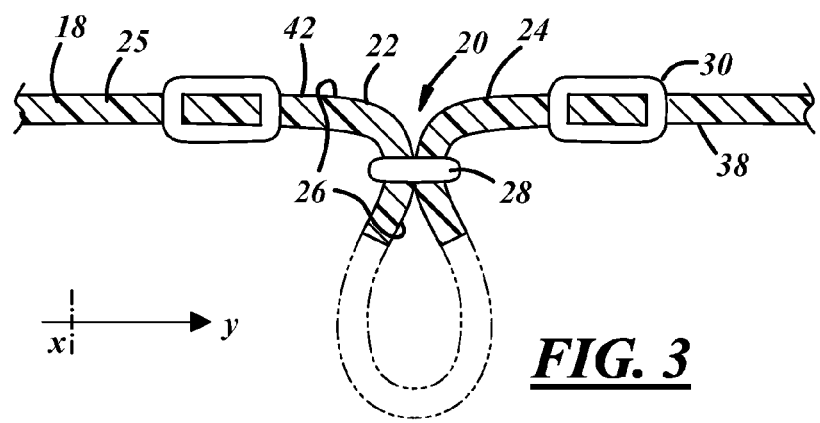
FIG. 3 is a cross-sectional view of the seam of FIG. 2, showing functional and decorative stitches.

A cross-section of decorative covering 18 taken through seam 20 of FIG. 2 is depicted in FIG. 3. Loop 36 is shown partially in phantom at a bottom side 38 of the covering 18. While loop 36 may or may not be a part of the final covering 18 that is disposed over a vehicle interior component substrate, it is shown here for reference because fold line 40 is located along the outer surface 26 of the covering material 25 and will be referred to in exemplary method steps below. Additionally, many of the same relationships may exist between fold line 40, which extends in the x-direction along the covering material outer surface 26, and the lines of decorative stitching 30 as those that exist between functional lines 28 and decorative lines 30 (e.g., parallelism, spacing, or symmetry).

First and second portions 22 and 24 of covering material 25 are portions of the material that lie on opposite sides (in the y-direction) of the line of functional stitching 28 or fold line 40. In the covering 18 shown in FIG. 3 where a portion of loop 36 has been removed, portions 22 and 24 may be considered separate pieces of covering material joined by functional stitching 28, though the two portions may have previously been portions of a single sheet of covering material before formation and partial removal of loop 36. At the line of functional stitching 28, separate portions of outer surface 26 may oppose one another where first and second portions 22 and 24 are sewn together. As shown in FIG. 3, outer surface 26 may be continuous along a top side 42, into seam 20 and along the inside of loop 36 prior to removal of a portion of the loop.

Functional stitching 28 is stitching that joins two or more portions of the same or different material together. As best shown in FIG. 3, stitching 28 joins first and second portions of the single sheet of covering material 25, thus forming loop 36. And after loop 36 is removed, the line of functional stitching 28 continues to join first and second portions 22 and 24 of covering material together, though the portions may then be considered separate pieces. As such, the functional stitching 28 typically includes thread that extends through multiple layers of covering material 25, including all individual layers of each layer of covering material 25.

Decorative stitching 30 is any stitching included in covering material 25 for aesthetic purposes. Any non-functional (i.e., non-joining) stitching that is viewable in covering 18 when finally assembled to its underlying substrate may be considered decorative stitching. As such, lines of decorative stitching may need only to extend through a single layer of covering material. However, some stitches can be both functional and structural. For instance, the exemplary seam 20 depicted in FIGS. 2 and 3 may be meant to visually simulate what is known in the industry as a French seam. The example of FIG. 3 could be modified to show a "true" French seam if loop 36 was cut at fold line 40 and the loose ends were sewn to the underside of the covering material with decorative stitching 30 when it was formed. In that case, decorative stitching 30 is also functional. A French seam does not necessarily include decorative stitching and may simply include non-symmetric lines of end-to-end stitches on either side of the functional seam that joins the two individual pieces.

A method of making a vehicle interior component that includes a decorative covering, such as a decorative covering according to one of the above-described embodiments, may also be described. In one embodiment the method generally includes the steps of providing a sheet of covering material having an outer surface, sewing a pair of spaced apart lines of decorative stitching along the outer surface of the covering material, perforating the covering material along a fold line, folding the sheet of covering material, sewing a line of functional stitching through the folded sheet of covering material to form a loop in the material, removing at least a portion of the loop, and disposing the sewn covering material over a component substrate. Some of these method steps may be performed in a different order than listed, some steps may be omitted, and other steps may be added.

Figure 4:
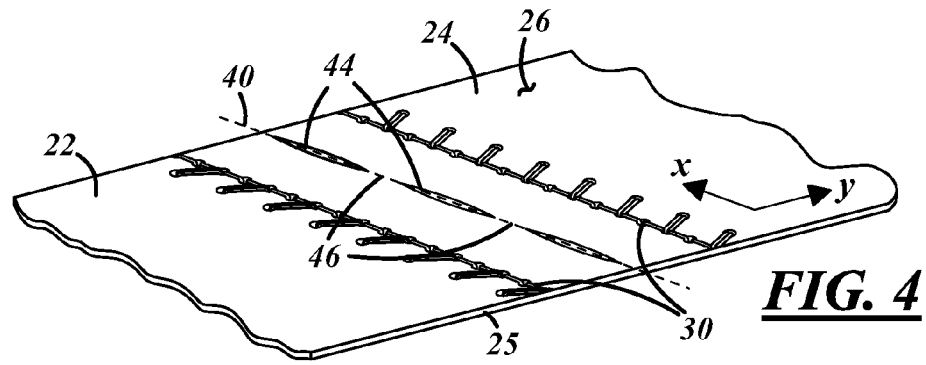
FIG. 4 shows a portion of a sheet of covering material including parallel lines of decorative stitching and perforations along a fold line, according to one embodiment.

FIG. 4 shows one embodiment of a single sheet of covering material 25 having an outer surface 26, a pair of spaced apart lines of decorative stitching 30 sewn along outer surface 26 and through the single sheet of covering material 25, and perforations 44. The decorative stitching may be sewn into the single sheet of covering material 25 before the perforations 44 are formed. Sewing the lines of decorative stitching into a single sheet of covering material while it is in flat form may provide certain benefits. Because the sewing is done on a flat piece of covering material, no special tooling is required beneath the material to accommodate other seams or extraneous material. Additionally, each line of stitching 30 can be sewn into the covering material 25 with symmetric patterns because both lines of stitching may be sewn in a single or common set-up. For example, the material 25 may be clamped into position and a sewing needle may sew one line of the decorative stitching and then the other, both starting at a known zero location with respect to the x-axis. In one embodiment, a single-needle CNC sewing machine may be used to precisely define the location of every individual stitch along the outer surface of the covering material to provide any desired symmetry, parallelism, or spacing.

A symmetric thread pattern is shown and arranged so that the thread patterns of each line of decorative stitching together form a herringbone pattern after the covering material is folded and the line of functional stitching is sewn into the material. In one embodiment, the lines of decorative stitching 30 are spaced apart by about 16-20 mm and are preferably spaced apart by about 18 mm, but the spacing may fall outside of that range and may depend on the particular application or on the type of equipment that is available.

Perforations 44 are in the form of slits in the illustrated embodiment. The step of perforating the covering material along the fold line 40 may be performed by any suitable cutting technique, including hot or cold knife cutting, ultrasonic cutting, laser cutting, machining, etc. Individual perforations 44 can be in any number of forms that allow the covering material to fold along fold line 40 more easily, such as holes, slots, recesses or slits, as shown. The perforations may extend only partially through the covering material 25 or they may extend completely through the material. Tabs or bridges 46 are located between successive perforations to connect the first and second portions of covering material 25 together so that it may be handled as a single sheet of material. Thus, perforating the covering material along fold line 40 can facilitate a sharp fold along fold line 40 while maintaining first and second portions 22 and 24 as a single piece of covering material.

Figure 5:
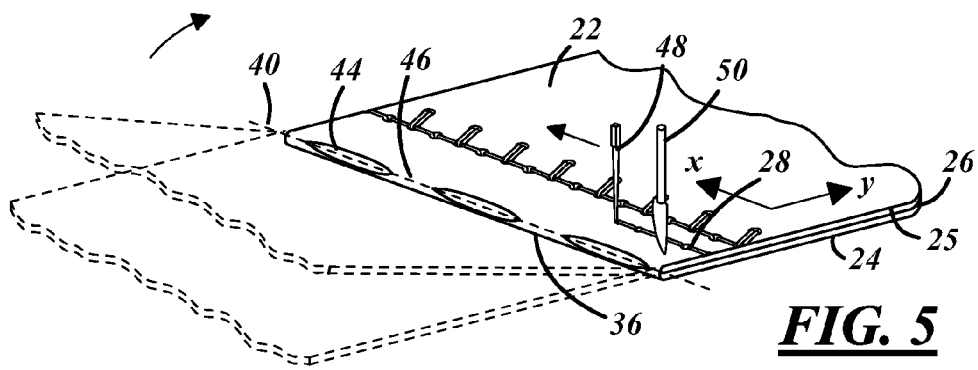
FIG. 5 shows the covering material of FIG. 4 folded along the fold line and having a line of functional stitching being sewn therein.

FIG. 5 illustrates the step of folding the single sheet of covering material 25 along fold line 40 such that first and second portions 22 and 24 are in facial contact along at least a portion of outer surface 26. Also shown in FIG. 5 is the step of sewing a line of functional stitching 28 proximate the fold line 40 with sewing needle 48. This step involves sewing the line of functional stitching 28 through the folded sheet of covering material 25 such that the stitching passes through both the first and second portions 22 and 24 of the outer surface 26 at a location proximate the fold line 40. Whether the decorative stitching 30 is applied before or after this step, these steps may be done such that the two lines of decorative stitching 30 are on opposite sides of the functional stitching 28 so that the functional stitching 28 is located between the two lines of decorative stitching 30, as shown. Moreover, these steps may be carried out such that each of the lines of decorative stitching 30 are equally spaced from the functional stitching 28 by a selected distance so that the functional stitching is located midway between the two lines of decorative stitching 30. In one embodiment, the line of functional stitching 28 is spaced from the fold line 40 by about 5-7 mm and is preferably spaced from the fold line by about 6 mm. The spacing may fall outside of that range and may depend on the particular application or on the type of equipment that is available, but the distance from the line of functional stitching to the fold line will generally be less than the distance from the fold line to the line of decorative stitching, where provided.

Cutting tool 50 is shown in FIG. 5, and may follow behind sewing needle 48 in the direction of the x-axis and be offset dimensionally from needle 48 in the direction of the y-axis. Where a sewing machine is so equipped, the cutting tool 50 can remove a portion of the loop 36 that is formed in the covering material 25 when functional stitching 28 is sewn into the material. In one embodiment, about 3-5 mm of loop 36 is removed, and preferably about 4 mm of loop 36 is removed. Or enough of the loop 36 is removed so that about 2 mm of covering material remains at the bottom side of the covering 18.

Figure 6:
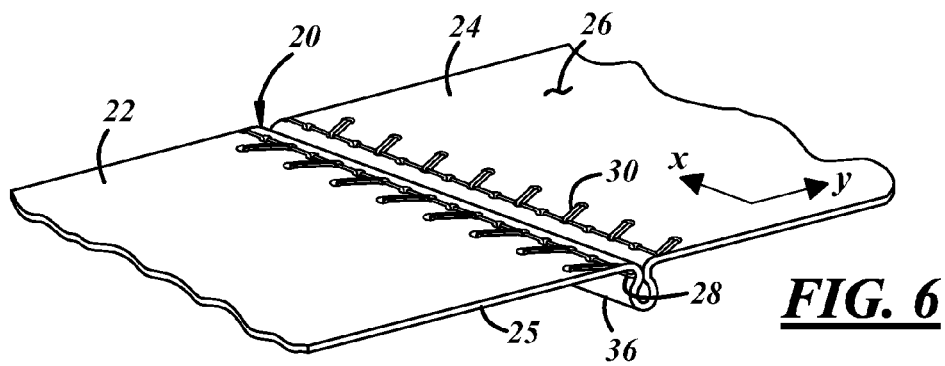
FIG. 6 shows the covering material of FIG. 5 unfolded and including a completed seam and a loop of covering material at a bottom side.
Figure 7:
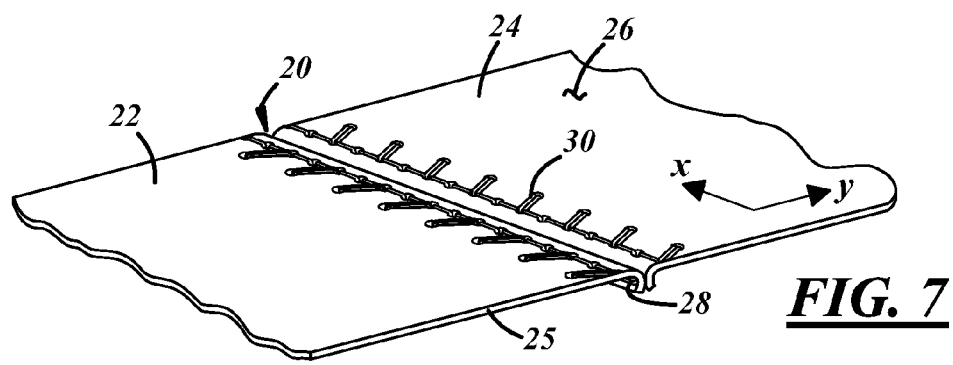
FIG. 7 shows the covering material of FIG. 6 with a portion of the loop removed.

FIG. 6 shows covering material 25 unfolded to reveal completed seam 20 after the functional stitching 28 is sewn into the material. Because the decorative stitching 30 may be formed with symmetry before the folding and functional stitching, the completed seam 20 may include symmetric decorative stitching. In the example of FIG. 6, loop 36 remains in the covering material 25—i.e., it was not removed during the functional stitching step. At least a portion of loop 36 may be removed by cutting or other means during the step of sewing the line of functional stitching 28 or after the functional stitching is complete. Alternatively, the loop 36 may remain with the covering 18 and be folded to one side or compressed between the seam 20 and the component substrate when disposed over said substrate. FIG. 7 shows the covering material of FIG. 6 with a portion of the loop removed and ready to be disposed over a substrate or move on to some other operation to complete assembly of the vehicle interior component.

As previously noted, the method described is illustrative and non-limiting. Additional steps may be included anywhere in the process, and one or more of the described method steps may be omitted. For example, in one embodiment, decorative stitching is not included as part of the method and only functional stitching is included in the seam. This may be a useful technique for achieving cut-and-sew appearance when starting with a single sheet of covering material—i.e., something that looks like a joint between two separate pieces of covering material can be formed anywhere along the covering material by folding the material at a desired location and sewing a line of functional stitching near the fold. In another embodiment, the step of perforating the covering material may be omitted, or it may be replaced by scoring the covering material to allow it to form a sharper fold. Additionally, while folding the covering material onto itself may be a convenient way to configure the material for sewing the line of functional stitching therein, other techniques may be devised to grasp the portion of the covering material nearest the desired location of the seam to allow sewing the functional stitching into the material without completely folding it.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of making a vehicle interior component having a decorative covering, the method comprising the steps of:
   (a) providing a sheet of covering material having an outer surface;
   (b) sewing a line of decorative stitching along the outer surface of the covering material;
   (c) folding the sheet of covering material along a fold line that is parallel with the line of decorative stitching such that first and second portions of the outer surface are in facial contact;
   (d) sewing a line of functional stitching through the folded sheet of covering material such that the stitching passes through both the first and second portions of the outer surface at a location between the fold line and the line of decorative stitching to form a loop in the covering material; and
   (e) disposing the sewn covering material over a component substrate;
   wherein step (b) is performed before step (d) with the sheet of covering material in flat form so that the loop formed in step (d) does not require accommodation by any tooling used during step (b).

2. The method of claim 1, wherein step (b) comprises sewing a pair of spaced apart lines of decorative stitching along the outer surface of the covering material so that at least a portion of the fold line is located midway between the pair of lines of decorative stitching.

3. The method of claim 2, wherein step (b) comprises sewing the decorative stitching such that each of the lines of decorative stitching includes a plurality of stitches arranged in respective thread patterns that are symmetric about the fold line.

4. The method of claim 3, wherein the respective thread patterns together form a herringbone pattern.

5. The method of claim 3, wherein step (b) comprises sewing the decorative stitching using a single-needle sewing machine.

6. The method of claim 1, further comprising the step of perforating the covering material along the fold line before step (c).

7. The method of claim 1, further comprising the step of removing at least a portion of the loop before step (e).

8. The method of claim 7, wherein the step of removing at least a portion of the loop further comprises cutting at least the portion of the loop off the decorative covering during step (d).

9. The method of claim 3, wherein the respective thread patterns are not symmetric with respect to an axis perpendicular to the line of functional stitching.

10. The method of claim 9, wherein the respective thread patterns together form a herringbone pattern.

\* \* \* \* \*